(12) United States Patent
Hoecker et al.

(10) Patent No.: US 9,301,137 B2
(45) Date of Patent: Mar. 29, 2016

(54) METHOD AND APPARATUS FOR MONITORING WIRELESS NETWORK ACCESS

(71) Applicant: Boingo Wireless, Inc., Los Angeles, CA (US)

(72) Inventors: Charles G. Hoecker, Pasadena, CA (US); Niels Jonker, Reston, VA (US)

(73) Assignee: BOINGO WIRELESS, INC., Los Angeles, CA (US)

( * ) Notice: Subject to any disclaimer, the term of this patent is extended or adjusted under 35 U.S.C. 154(b) by 0 days.

(21) Appl. No.: 13/871,287

(22) Filed: Apr. 26, 2013

(65) Prior Publication Data
US 2013/0235751 A1    Sep. 12, 2013

Related U.S. Application Data

(62) Division of application No. 11/769,268, filed on Jun. 27, 2007, now Pat. No. 8,767,686.

(60) Provisional application No. 60/833,529, filed on Jul. 25, 2006.

(51) Int. Cl.
*H04L 29/06* (2006.01)
*H04W 88/00* (2009.01)
*H04W 48/18* (2009.01)
*H04W 12/06* (2009.01)
(Continued)

(52) U.S. Cl.
CPC ........... *H04W 12/06* (2013.01); *H04L 63/0876* (2013.01); *H04W 24/00* (2013.01); *H04W 76/02* (2013.01); *H04W 88/005* (2013.01); *H04W 48/18* (2013.01)

(58) Field of Classification Search
CPC ..... H04W 12/06; H04W 12/08; H04W 88/08; H04W 24/00; H04W 76/02; H04W 48/18; H04W 88/005; H04M 15/49; H04L 63/0876
USPC .................................. 370/241, 252, 328, 338
See application file for complete search history.

(56) References Cited

U.S. PATENT DOCUMENTS

| 5,919,247 | A  | 7/1999 | Van Hoff et al. |
| 6,269,395 | B1 | 7/2001 | Blatherwick et al. |

(Continued)

FOREIGN PATENT DOCUMENTS

JP          2006-20088 A       1/2006

OTHER PUBLICATIONS

Patent Cooperation Treaty, International Search Report, Dated Feb. 4, 2008, 9 Pages.

*Primary Examiner* — Dinh P Nguyen
(74) *Attorney, Agent, or Firm* — Lapple Ubell IP Law, LLP; Franklin Ubell

(57) ABSTRACT

A system and method for monitoring wireless network access, and use of a detected wireless network connection are described. A client component (e.g., software component), or client, can be downloaded to a computing device, which leverages off of the computing device's ability to locate and establish a network connection. The client component listens for network connection activity, and determines whether the device has established a network connection with a network known to the client. If the client determines that a network connection has been established to a known network, the client uses the network connection to log the user onto the network.

10 Claims, 12 Drawing Sheets

Figure 1B:
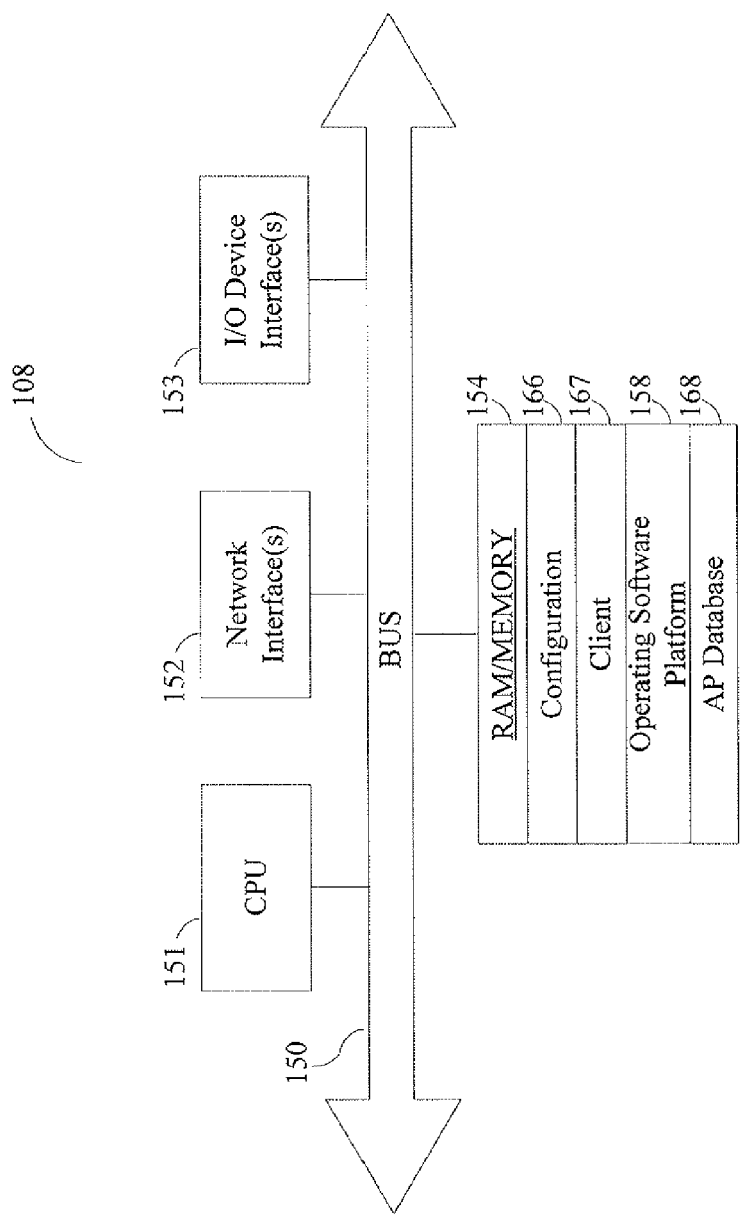

(51) Int. Cl.
*H04W 76/02* (2009.01)
*H04W 24/00* (2009.01)

(56) References Cited

U.S. PATENT DOCUMENTS

| | | |
|---|---|---|
| 6,522,880 B1 | 2/2003 | Verma et al. |
| 6,625,135 B1 | 9/2003 | Johnson et al. |
| 6,810,428 B1 | 10/2004 | Larsen et al. |
| 2001/0029524 A1 | 10/2001 | Smith et al. |
| 2002/0174194 A1 | 11/2002 | Mooney et al. |
| 2003/0031150 A1 | 2/2003 | Yukie |
| 2003/0055990 A1 | 3/2003 | Cheline et al. |
| 2003/0063581 A1 | 4/2003 | Shanbhag |
| 2003/0174681 A1 | 9/2003 | Gilberton et al. |
| 2004/0066759 A1 | 4/2004 | Molteni et al. |
| 2004/0068653 A1 | 4/2004 | Fascenda |
| 2004/0095932 A1 | 5/2004 | Astarabadi et al. |
| 2005/0044216 A1 | 2/2005 | Zhang et al. |
| 2005/0144237 A1 | 6/2005 | Heredia et al. |
| 2005/0147060 A1 | 7/2005 | Buckley |
| 2005/0176473 A1* | 8/2005 | Melpignano .................. 455/574 |
| 2005/0190747 A1 | 9/2005 | Sindhwani |
| 2005/0198319 A1 | 9/2005 | Chan et al. |
| 2005/0243758 A1 | 11/2005 | Torarp et al. |
| 2005/0278748 A1 | 12/2005 | Koh et al. |
| 2006/0026289 A1 | 2/2006 | Lyndersay et al. |
| 2006/0068799 A1 | 3/2006 | Morton et al. |
| 2006/0117381 A1* | 6/2006 | Sylvain ............................ 726/8 |
| 2006/0142035 A1 | 6/2006 | Bahl et al. |
| 2007/0081477 A1 | 4/2007 | Jakkahalli et al. |

* cited by examiner

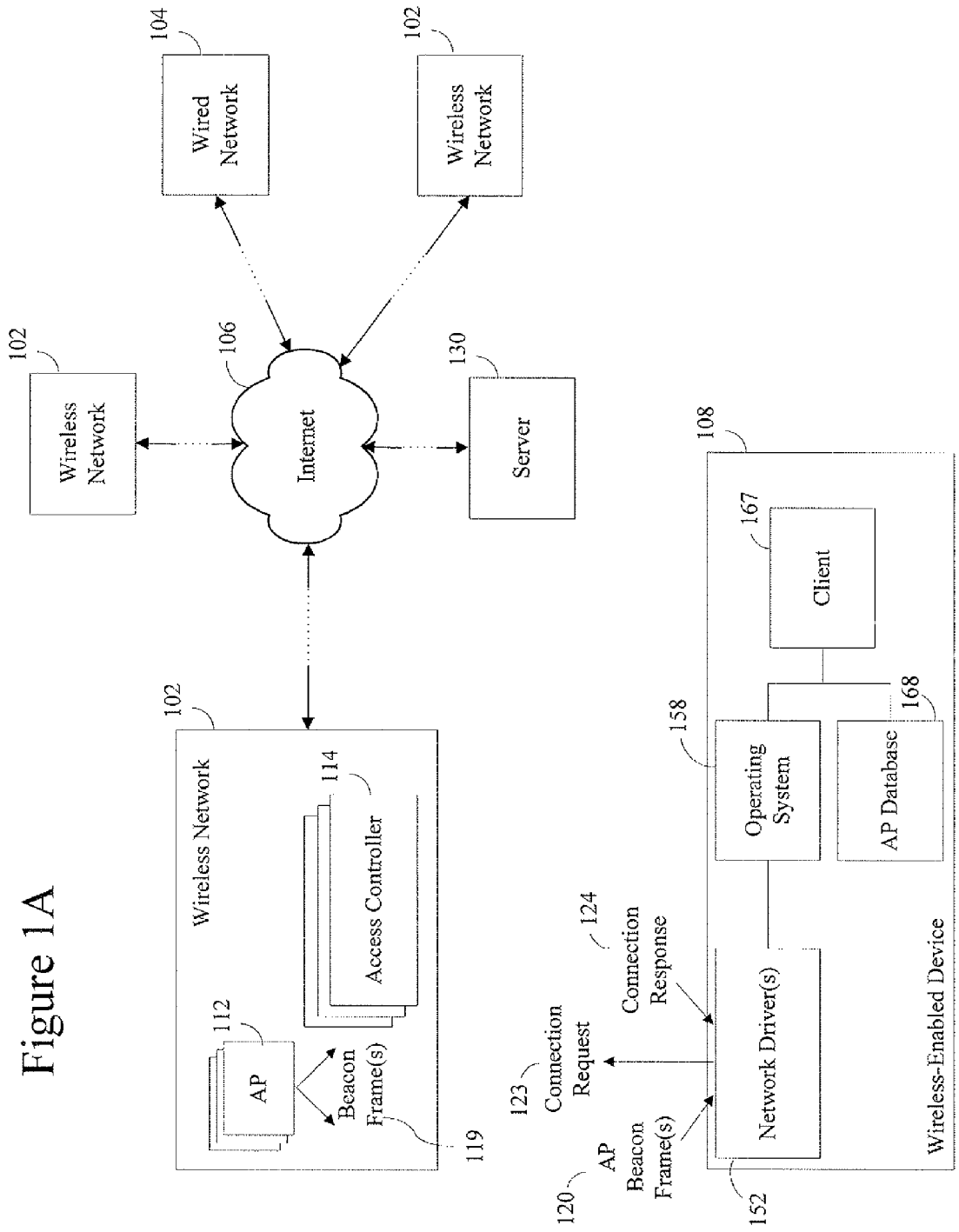

Figure 4A

Figure 4B

Figure 5A
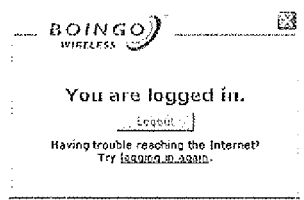
Figure 5B
Figure 5C
Figure 5D
Figure 5E
Figure 5F
Figure 5G

METHOD AND APPARATUS FOR MONITORING WIRELESS NETWORK ACCESS

CROSS REFERENCE TO RELATED APPLICATION(S)

This application is a divisional of and claims priority to U.S. Utility patent application Ser. No. 11/769,268, entitled "Method and Apparatus For Monitoring Wireless Network Access," filed on Jun. 27, 2007, which claims priority to U.S. Provisional Patent Application Ser. No. 60/833,529, entitled "Method and Apparatus For Monitoring Wireless Network Access," filed on Jul. 25, 2006, the contents of both of which are incorporated herein by reference in their entireties.

This application is related to U.S. patent application Ser. No. 10/325,450, entitled "Method and Apparatus For Accessing Networks by a Mobile Device," filed on Dec. 19, 2002, the contents of which are incorporated herein by reference, and related to U.S. patent application Ser. No. 11/435,019, entitled "Network Access Point Detection and Use," filed on May 15, 2006, the contents of which are incorporated herein by reference.

A portion of the disclosure of this patent document contains material which may be subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

A method and apparatus for monitoring wireless network access is disclosed.

2. Background Discussion

Wireless networks have become more prevalent and provide a mechanism for connecting to other networks, including the Internet. Wireless fidelity "WiFi" networks (e.g., 802.11 networks) have recently emerged as the dominant standard for wireless networks. This is largely due to the ease with which a WiFi network can be installed, and the minimal cost involved. For example, an operator, can setup a "hot spot" with one or more digital subscriber lines (DSLs) and/or T1 lines and equipment that controls access to the wireless network, and then sell high speed wireless Internet access for a fee. A "hot spot" typically has one or more wireless access points (APs) that serve as the connection point between a customer's device and the WiFi network. The customer's device can be any device (e.g., desktop or laptop computer, personal digital assistant, digital camera, mobile phone, automobile, gaming devices, consumer electronic equipment, etc.) which has a WiFi chip capable of communicating with the wireless network.

As more and more hot spots are installed, there will be more of an opportunity for users to gain access to the Internet via a wireless network connection. Due to the number of different hot spot, or wireless network, operators and different mechanisms for gaining wireless network access, however, wireless access to the Internet is not as seamless as a user would prefer it to be.

In order to gain access to a wireless network, a user must first have authorization from the wireless network operator, which typically requires that the user have an agreement with the hot spot operator, or another entity that has an agreement with the wireless network operator, which identifies the access terms and fees. Based on such an agreement, the wireless network operator provides the user with connection/login procedures, which the user must use to gain access to the operator's wireless network.

A user's WiFi-enabled device, or wireless device, typically has the ability to sniff, or scan for, beacon frames, or signals, broadcast by access points which are a part of existing wireless networks. More particularly, the wireless device will tune to one or more available channels and listen for all beacon frames, or signals, broadcast by the wireless networks on that channel. The beacons received by the device can be from one or more wireless networks, and one or more wireless network providers, each of which have different connection/login procedures.

The wireless device uses the beacon frames received to identify a wireless network and corresponding wireless network provider. Thereafter, an attempt is made to connect to the wireless network using the appropriate login procedures for the network provider. Obtaining and maintaining access to a wireless network is not simple due in large part to the number of wireless networks, and corresponding network providers, available and the fact that the user is "mobile" and attempting to enjoy a seamless network access despite being mobile. A typical wireless device periodically receives beacon frames broadcast by various access points, which can be used to change to a different access point and/or wireless network. The latter change might require the wireless device to establish a connection with a different wireless network and different wireless network connection procedures than that used with a previous connection. To be truly mobile, the user's device might need to interact with multiple wireless networks and wireless network providers, and the diverse connection (e.g., login) procedures required by each of the wireless network providers.

SUMMARY

In accordance with one or more embodiments, a utility is provided to facilitate a user's wireless network access, such that interaction with various connection procedures required by different wireless network providers is transparent to the user. Such a utility can take advantage of capabilities of modern operating systems' ability to establish a low-level connection (e.g., layer 2 connectivity) to a wireless network, by detecting such a low-level connection and establishing a high-level connection, which can be used by the user to access the wireless network. In addition, such a utility can be used in connection with aspects described in U.S. patent application Ser. No. 10/325,450, entitled "Method and Apparatus For Accessing Networks by a Mobile Device", and U.S. patent application Ser. No. 11/435,019, entitled "Network Access Point Detection and Use" to be able to determine whether the low-level connection can be used to establish a wireless network connection. Furthermore and in a case that multiple wireless networks from different network providers are available, a utility is provided to select a preferred provider, either automatically or by alerting the user and allowing the user to make the selection.

In accordance with one or more embodiments, a client utility, also referred to herein as a client, need not scan for, or associate to, a network. In accordance with such an embodiment, the client detects that a low-level network connection has been established, and performs an automated login process for the user. A type of detection used by such a client is passive in that it does not perform active scanning for a wireless network (e.g., detecting beacon frames broadcast by wireless networks). Rather, the client is installed on a client device and allows capabilities provided by the client device's operating system to perform the active scanning.

In accordance with embodiments disclosed herein, the client can be installed on a client device as a part of the user's signup process with a network provider. In accordance with disclosed embodiment, installation of the client can include an automatic configuration of the client to include the user's username and password, which can be used to connect to a wireless network, thereby avoiding the need for the user to provide this information (e.g., at a time when the client is installed and/or connection to a wireless network is attempted).

In accordance with one or more embodiments, a client component (e.g., software component), or client, can be downloaded to a computing device, which leverages off of the computing device's ability to locate and establish a network connection. The client component listens for network connection activity, and determines whether the device has established a network connection with a network known to the client. If the client determines that a network connection has been established to a known network, the client uses the network connection to log the user onto the network.

Advantages of this approach include a client that can have a lighter footprint (size, resource needs, etc.) than might otherwise be needed, since the client can rely on other components to perform establish a connection with a network. In addition, the client can rely on device components to establish the network connection, but the client can control (or at least direct) the manner in which the user is logged onto the network. For example, the client can prompt the user to choose a particular account to log onto the network, rather than another account, if the client determines that the network connection is such that the user can use the first account. The client can then either select the account for the user, or prompt the user to select the account, in a case that the account is available to the user.

Other aspects include a download process used to download the client software component as well as configuration information, including user authentication information, as a downloadable file. Advantageously, the download process integrates the steps of transferring the client component to the computing device, installing the client on the computing device, and configuring the client to use the user's authentication information. This process is more automatic and more convenient to the user than multiple discrete manual steps. The process can be used, for example, to eliminate a need for the user to manually start an installation process or to re-input the user's authentication information (e.g., at a time when the user is attempting to log onto the wireless network).

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides an architectural overview example of components used in accordance with one or more embodiments of the present disclosure.

Figure 2A:
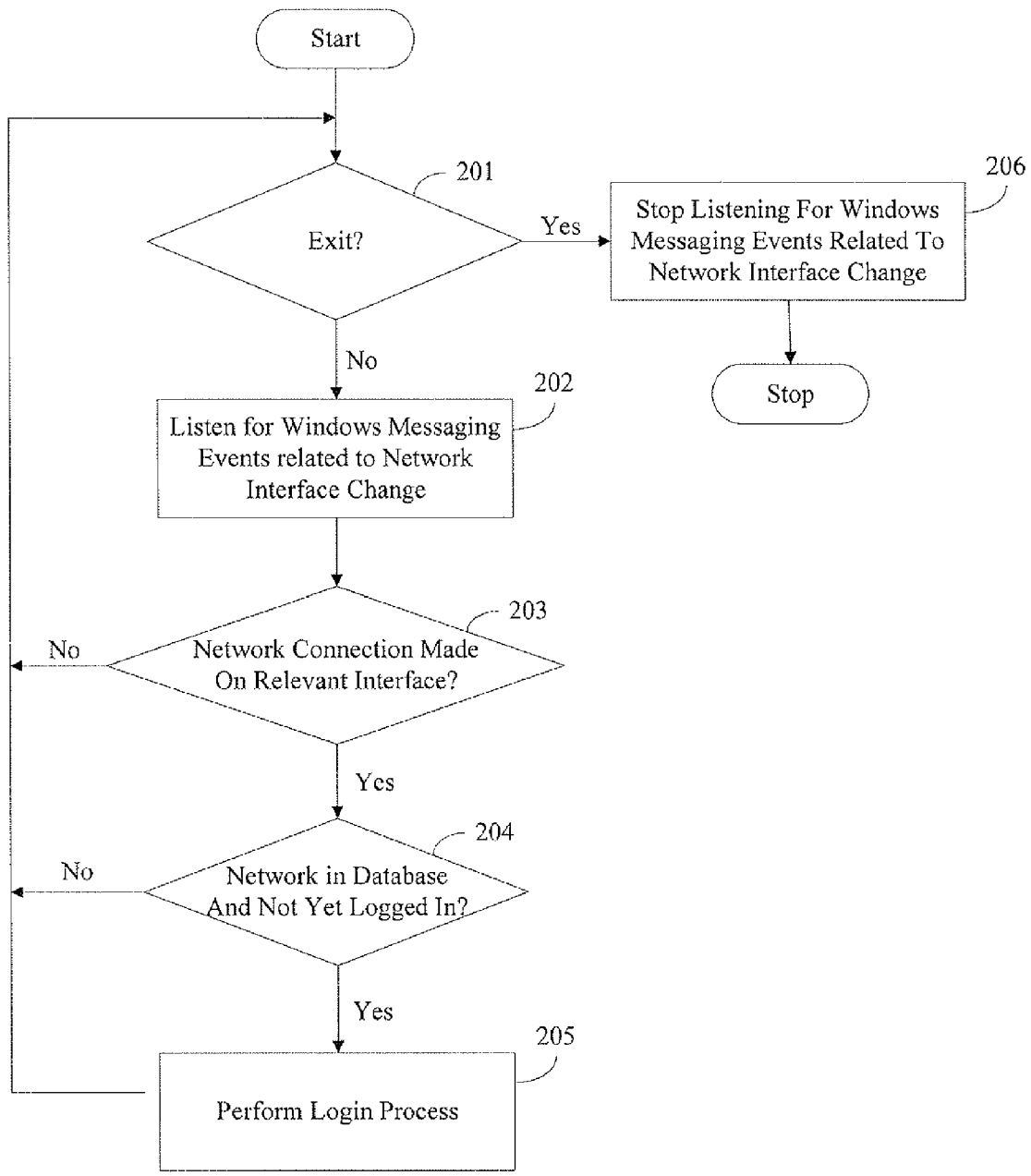
Figure 2B:
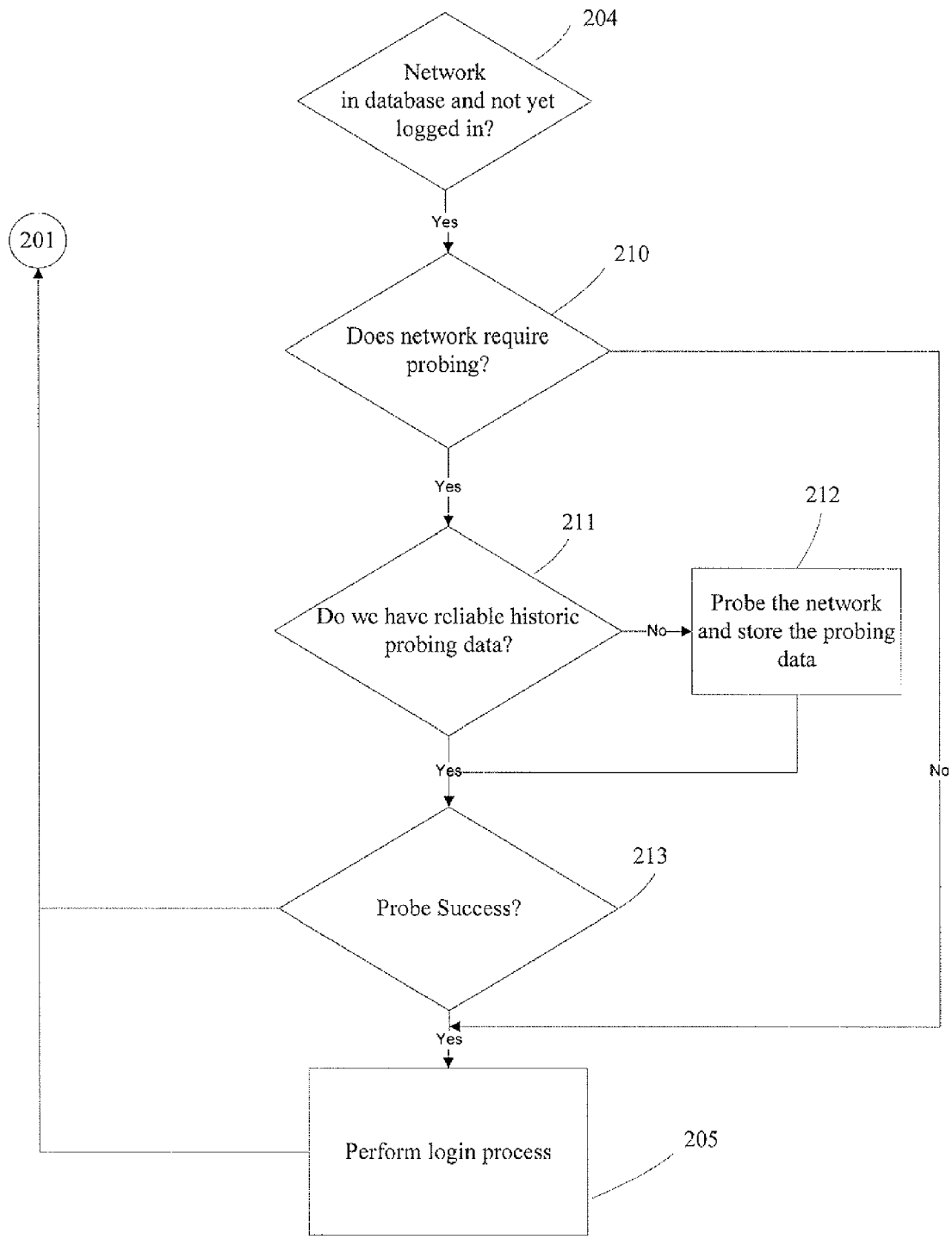
Figure 2C:
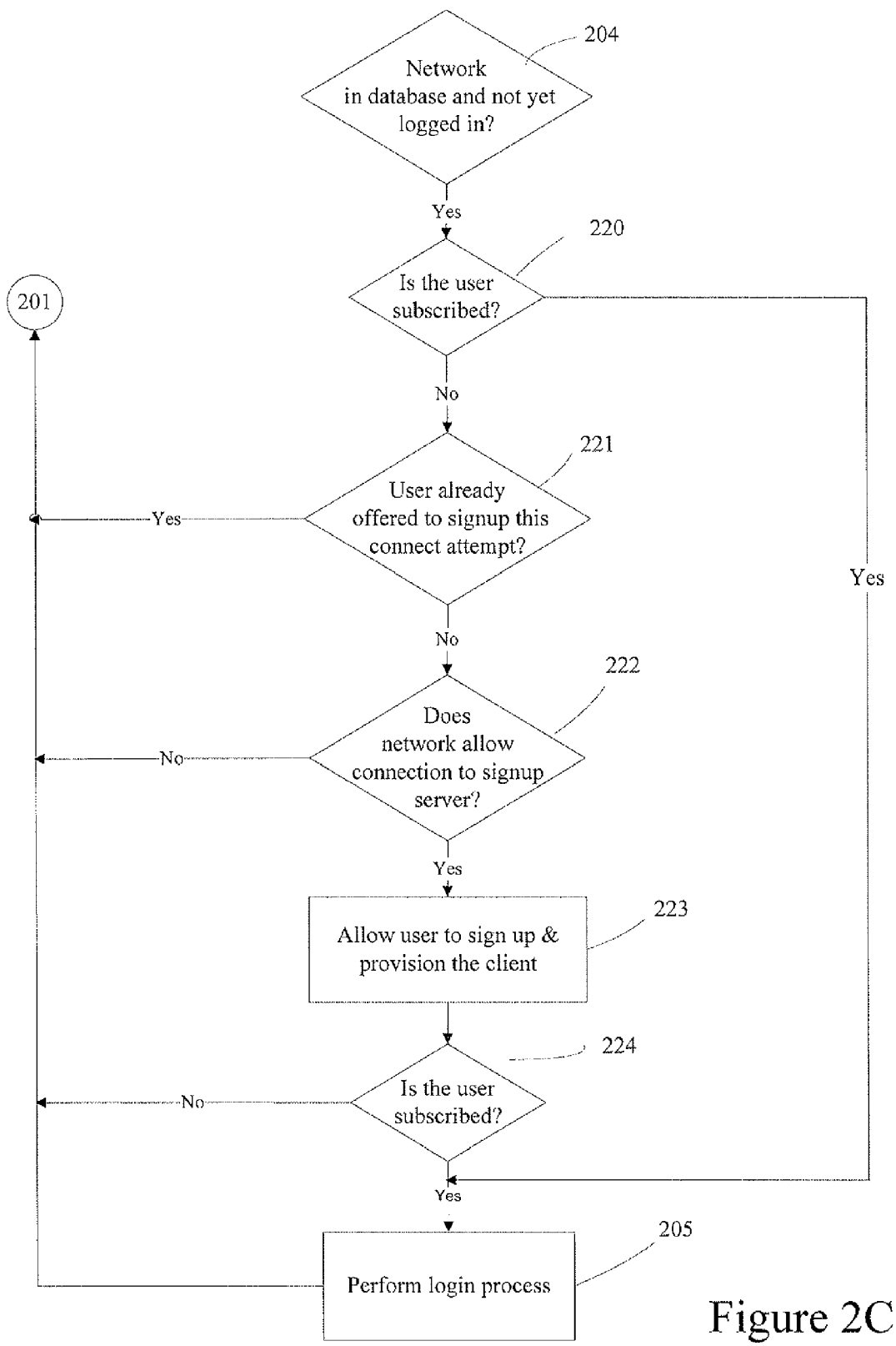

FIG. 2, which comprises FIGS. 2A, 2B and 2C, provides an example of a client process flow in accordance with one or more embodiments of the present disclosure.

Figure 3A:
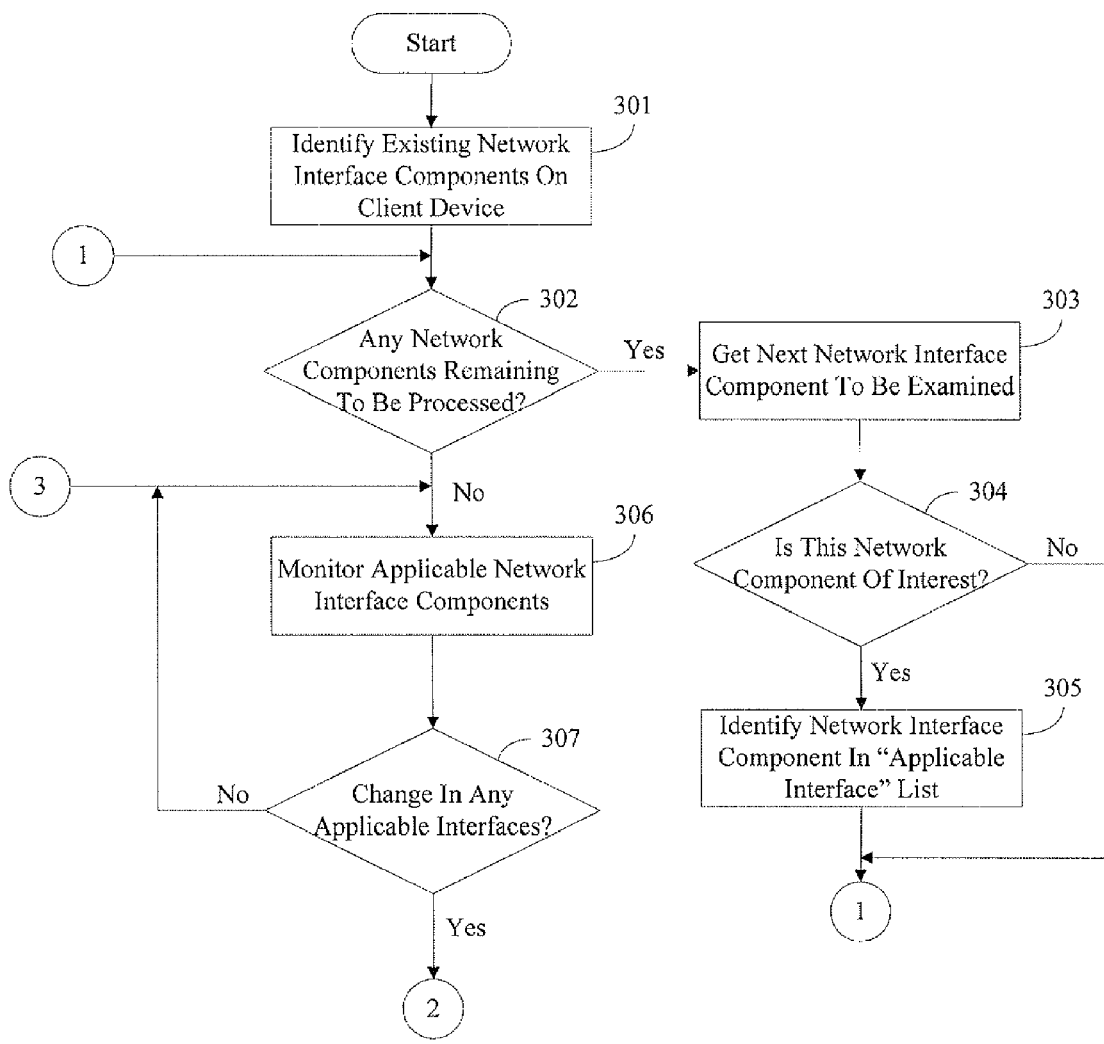
Figure 3B:
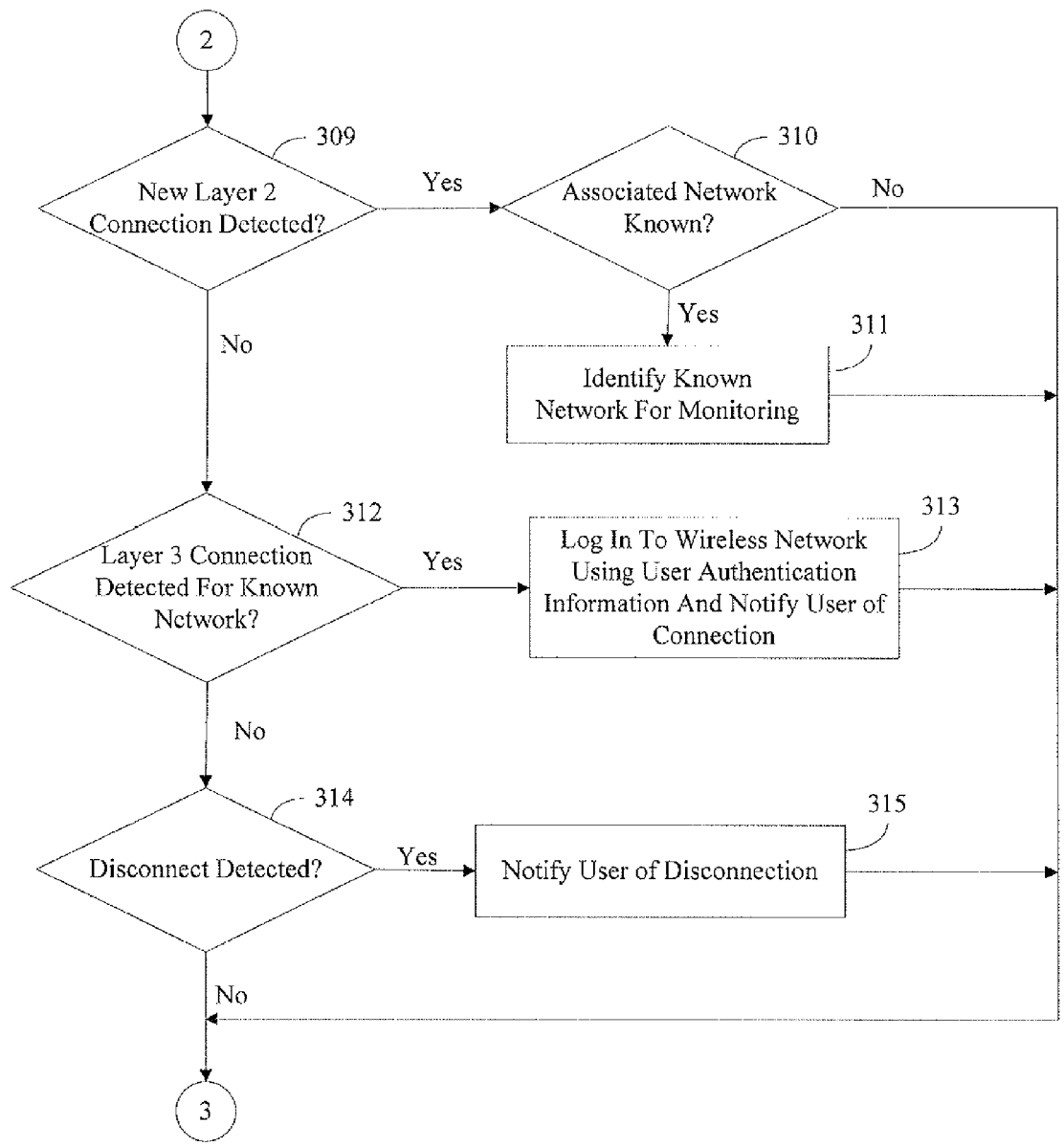
Figure 3C:
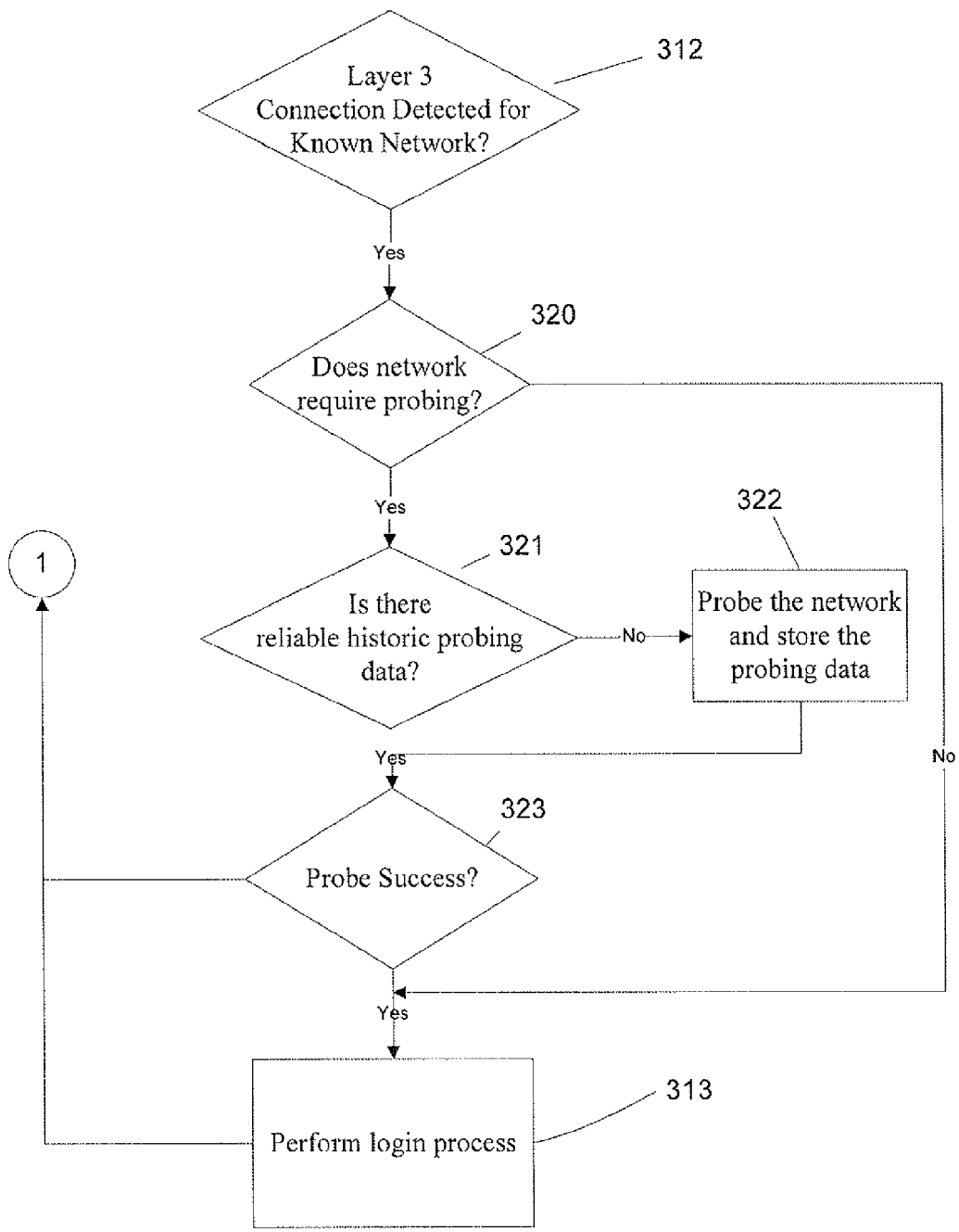

FIG. 3, which comprises FIGS. 3A, 3B and 3C, provides a detailed client process flow for use in accordance one or more embodiments of the present disclosure.

FIG. 4, which comprises FIGS. 4A to 4F, provides examples of dialogs presented to a user during a sign up process for use with one or more embodiments disclosed herein.

FIG. 5, which comprises FIGS. 5A to 5G, provides examples of user interface widgets which provide feedback to a user during a network logon process in accordance with disclosed embodiments.

DETAILED DESCRIPTION

In general, the present disclosure includes a network access point detection and use system and method.

Certain embodiments of the present disclosure will now be discussed with reference to the aforementioned figures, wherein like reference numerals refer to like components. Although embodiments of the present disclosure are described with reference to the 802.11 wireless network environment, it should be apparent that the disclosed embodiments have application to other network environments, including other wireless networking environments, examples of which include, without limitation, IEEE Standards 802.15, 802.16 and 802.20, Wireless Local Area Networks (Wireless LANs), Wireless Personal Area Networks (Wireless PANs), and Wireless Metropolitan Area Networks (Wireless MANs), etc.

In accordance with one or more disclosed embodiments, client software, or client, executing on a user's client device, or device, is used to detect a low-level wireless network connection and to use the low-level network connection to connect the user to a wireless network. The client can be downloaded as part of a process in which a user signs up with a given wireless network provider. For example, during the sign up process, the user provides certain information about the user (e.g., name, address, payment details such as credit card information, and authentication information such as username and password). As part of the sign up process, the user can be presented with a choice of downloading the client. If the user elects to download the client, the program code for the client is downloaded to the user's device, together with the authentication information needed to authenticate the user to connect to a wireless network.

FIG. 1, which comprises FIGS. 1A and 1B, provides an architectural overview example of components used in accordance with one or more embodiments of the present disclosure. Device 108 is a wireless-enabled device. A wireless-enabled device can be any device that includes network interface function, which can be provided by an operating system or some other software, e.g., software provided by a wireless network provider or WiFi chip hardware manufacturer, for example. Examples of such a device include, but are not limited to, desktop or laptop computer, personal digital assistant, digital camera, mobile phone, automobile, gaming device, consumer electronic equipment, and the like.

In accordance with one or more embodiments, device, 108 comprises one or more network drivers (or interfaces) 152, operating system (or O/S) 158, AP database 168 and client 167. Each network driver 152, which can be a driver such as an operating system-level driver for example, can be used to connect to an AP 112 instance of a wireless network 102, and then to send and receive network transmissions. In accordance with embodiments of the present disclosure, client 167 is configured to detect a network interface connection using information provided by O/S 158, identify an appropriate network connection (and AP 112) using AP database 168, and log into a wireless network using account information for the user retrieved form AP database 168. In accordance with embodiments disclosed herein and in the patent applications reference herein, AP database 168 can contain a list of SSIDs and references to login scripts, e.g., for use in logging onto a wireless network. AP database 168 can be stored locally on device 108, and can be updated on a periodic basis. U.S. patent application Ser. No. 10/325,450, which is incorporated herein by reference, provides examples of its contents and mechanisms for updating and maintaining AP database 168. In accordance with one or more embodiments presently disclosed, AP database 168 can include all or some portion of the information identified in U.S. patent application Ser. No. 10/325,450. For example and in accordance with one or more embodiments disclosed herein, an AP database 168 entry comprises an SSID and corresponding script information.

The example architecture shown in FIG. 1A includes instances of wireless network 102. Each instance of wireless network 102 can include one or more instances of access point (AP) 112. AP 112 is a networking device that serves as a communication or connection point for a device 108 and wireless network 102. Using wireless network 102, device 108 can gain access to the Internet 106, wired network 104, and/or other instances of wireless network 102, for example.

A wireless network 102 instance can include, but need not include, one or more instances of access controller 114. Access controller 114 comprises a device used to control access to wireless network 102. Access controller 114 can be used to enforce a wireless network operator's rules for accessing wireless network 102, and/or Internet 106. Access control can be accomplished by, for example, allowing a network component of device 108 to associate with network 102 without requiring authentication, and then blocking the device's 108 traffic until valid authentication information is provided. Access controller 114 is typically used with commercial instances of wireless network 102, such as one provided by a hot spot operator. Another instance of wireless network 102, such as one used in a home environment, need not include an access controller 114. Each instance of wireless network 102 can have specific procedures, or methodologies, for associating, authenticating, and/or connecting to the network, which can (and likely do) vary from one instance to another of wireless network 102.

One example of a scenario that might be used involves a process of receiving the device's 108 initial Web page request, and redirecting the request to access controller 114, which requests the authentication information from the device 108. If the device 108 provides valid authentication information, access controller 114 permits unrestricted use of wireless network 102 by the device 108.

In accordance with one or more embodiments presently disclosed, client 167 can detect such an association and then provide the required authentication so as to establish a network connection, or session, for a user of device 108.

In accordance with at least one embodiment, server 130 can be used to download client 167. In addition, server 130 can be used to transmit other data, including configuration information for client 167, incremental updates to such configuration information, and/or updates to client 167.

In the example architecture shown in FIG. 1A, a single device 108 and server 130 are shown for the sake of simplicity. It should be apparent that there can be multiple instances of device 108 and/or multiple instances of server 130.

FIG. 1B provides an example of an internal architecture of device 108 in accordance with one or more embodiments of the present disclosure. It should be apparent that device 108 can include additional components. Such additional components can, for example, depend on the type of device. Device 108 comprises a central processing unit (CPU) 151, one or more instances of network driver 152, one or more instances of Input/Output (I/O) device interface 153, and memory 154, all of which can interface via bus 150. Network driver 152 can comprise a wireless network driver, which can control a WiFi circuitry, for example. At least one instance of network driver 152 has the capability to detect instances of AP 112, and to send and receive network communications using a network communications protocol such as that defined by the Transmission Control Protocol/Internet Protocol, or TCP/IP, protocol suite. Memory 154 can comprise a combination of temporary and persistent storage, and can include random access memory (RAM). Contents of memory 154 comprise cache 155, configuration 156, client 167, operating software platform 158, and AP database 168. In addition, memory 154 can include permanent storage in addition to RAM. Examples of such persistent storage include, but are not limited to, flash memory and disk storage (e.g., fixed or removable), CD, etc.

O/S 158 includes program code executable by CPU 151 to control the operations of device 108. In accordance with one or more embodiments, O/S 158 includes a facility to allow client 167 to monitor activity of network driver 152, so as to identify an appropriate network connection, for example. Examples of configuration 156 include, without limitation, parameters used to control client 167, updates to AP database 168, login procedures and/or scripts, etc.

Referring again to FIG. 1A, AP 112 instances broadcast beacon frames 119. Network driver 152 "scans" 120, also referred to herein as "sniffs" or detects, a beacon frame 119 broadcast by an instance of AP 112. That is, for example, network driver 152 of device 108 listens for beacon frames 119 broadcast on a given channel by instances of AP 112. A beacon frame 119 typically includes information such as an SSID, BSSID, as well as security settings. Network driver 152 is further configured to transmit a connection request 123 and to receive a connection response 124, and to transmit and receive network transmissions.

FIG. 2A provides an example of a client process flow in accordance with one or more embodiments of the present disclosure. Generally and in accordance with one or more embodiments, once installed on a client device, the client 167 executes in the background to detect a network interface connection, determine whether the network interface connection can be used to log the user into a wireless network. In accordance with one or more embodiments, the client 167 can start automatically and run in the background on device 108 at the end of the signup process, so as to be invisible to the user. The client 167 can remain in this state until a network interface connection to a hot spot is made by an instance of network interface 152.

In addition and in accordance with one or more embodiments, the client 167 can start automatically after it is installed on a device 108. The client 167 can also be invoked whenever the device 108 is restarted as part of loading the operating system ("O/S"), for example.

At step 201, upon startup and until the client 167 exits, the client 167 operates to detect a network interface connection and to use a detected network interface connection to log onto a wireless network 102. In accordance with one or more embodiments, there is no user interface visible for client 167 during startup/initialization of client 167, or while the client 167 operates to detect a network interface connection. In accordance with one or more embodiments, client 167 can receive event/state information via notifications/messages from O/S 158. At startup, in accordance with one or more embodiments, the client 167 can implicitly generate a message for its own consumption reflecting the connected state of a given interface.

At step 202, the client 167 listens for events generated by one or more instances of network driver 152 via O/S 158. In accordance with one or more embodiments, the client 167 can register with O/S 158 to receive events associated with network driver 152. Such events can signal a change in a state of a network interface connection, for example. When messages related to the interface are received from the O/S 158, the client 167 can check the content of these messages to see whether a successful network interface connection has been established. A network interface connection can be considered to be established based on a number of criteria, such as the physical or logical connection to a network, or the assignment of an Internet Protocol (IP) address by the network to the computer on which the client is running, for example.

For each network interface connection event, or state change, the client 167 determines whether the detected event signals that a network driver 152 has established a network interface connection with an AP 112 instance, at step 203. When client 167 determines that a network interface connection is established on a relevant interface (e.g., via a network driver 152 instance), the client 167 determines a network name corresponding to the network interface connection. For example, in a case of a Wi-Fi network, a network name can be provided by the Service Set Identifier, or SSID, as defined in the 802.11 standard. On other networks, a different identifier may be used.

In accordance with one or more embodiments, the client 167 accesses, and maintains, a database of known SSIDs, AP database 168. If the SSID corresponding to the network interface connection identified by the client 167 matches a known SSID (e.g., corresponds to an entry in the database maintained by the client), the client 167 can initiate a login process to log the user into the wireless network via the detected network interface connection. Thus, at step 204, client 167 queries AP database 168 to identify the wireless network 102 associated with the AP 112 instance, and whether there is a logon procedure available for the identified wireless network 102 to connect the user. In addition and at step 204, a determination is made whether or not the user is currently logged on and/or whether a new connection should be established for the user. If a new/replacement connection is to be made and the AP 112 instance can be used to establish the connection, processing continues at step 205 to perform the login process. As is discussed herein, in a case that there are multiple login procedures (e.g., for multiple different providers) available, the user can be prompted to select one of the login procedures/providers.

In accordance with one or more embodiments, once the client exits at step 201, the client 167 will stop listening for notifications/messages from O/S 158 related to network interface changes at step 206.

As such, the client 167 need not conduct an active scan for broadcast beacons to identify an available network in order to make a network connection for the user. Instead, the client 167 can rely on the O/S 158 or other software on the user's device 108 to locate a suitable AP 112 of a wireless network 102. Once a suitable AP 112 is identified, client 167 can be configured as is described in U.S. patent application Ser. No. 10/325,450 and/or U.S. patent application Ser. No. 11/435,019, the contents of both of which are incorporated herein, to interact with the gateway (e.g., AP 112 and access controller 114) using a scripting mechanism and configuration information, for example, as described therein.

Advantageously, embodiments of the present disclosure recognize that many users initiate a network connection by opening a web browser window, which action results in O/S 158 and network driver 152 responding and establishing a network interface connection. In accordance with embodiments disclosed herein, the client 167 can take advantage of this capability provided by the O/S 158 and network driver 152, and need not include such functionality. Once an appropriate network interface connection is located, the client 167 can use the detected network interface connection to log the user into a wireless network 102.

The login procedure used by the client can depend on the wireless network provider on a predetermined configuration or based on a selection made by the user in an interaction between the user and a user interface caused to be displayed by client 167 as part of a logon procedure. In accordance with embodiments disclosed herein, client 167 can utilize functionality external to the client 167 (e.g., functionality provided by O/S 158) to establish a network interface connection, but still retain control of the logon process and/or interact with the user during the logon process. As is discussed herein, the client 167 can interact with the user to offer alternatives to the user, such as which wireless network account/provider to use to connect to a wireless network 102.

In accordance with one or more embodiments, the client 167 can alternatively perform probing in certain circumstances, as will be described with reference to the client process flow illustrated in FIG. 2B. The client process flow associated with probing illustrated in FIG. 2B is performed between steps 204 and 205 of FIG. 2A. After step 204, the client 167 determines whether the network 102 requires probing in step 210. In some embodiments, the client 167 could determine that probing is required from a field in the AP database 168. If the network 102 does not require probing, the client process flow would continue on to the login process in step 205 as described previously with reference to FIG. 2A.

If the network 102 does require probing, the client 167 will determine whether there exists a reliable cache or history of probing data in step 211. In accordance with embodiments disclosed herein, the cache would store the BSSIDs of networks that have been previously probed successfully and, additionally, could also store the BSSIDs for networks that have failed previous probes. If a probe result was found in the AP database 168 by the client 167, the client process flow would continue without further probing. If no probe result was found for the network, the client 167 would perform a probe for the network in step 212.

A probe determines whether the client 167 would be able to login to the network 102 by interacting with the access gateway. One example of a probe would be inspecting the contents of the webpage served up by the gateway and determining whether it contains certain identifiable parameters, such as a location idea parameter. Another example of a probe would be performing a mock login procedure against the gateway and, in the situation where pre-defined login responses are detected, concluding that a network is usable. In some embodiments described herein, probing is performed dynamically based on configuration data, such as is performed in the login portion of client process flow described herein or described in U.S. patent application Ser. Nos. 10/325,450 and/or 11/435,019. One example of probing described in such applications involves: detecting a beacon message from at least one access point of the wireless network, the beacon message including information identifying the access point; attempting, using at least one predefined operation, to communicate with the access point; determining a usability status based on a response received from the access point to the at least one predefined operation; and storing the determined usability status in a cache, the usability status being associated with a unique identifier of the access point. The foregoing probing examples are merely presented for illustrative purposes and are not intended to encompass all possible manners of performing the probe. The probing results are then stored in cache.

Next, the probe result, either the current from step 212 or a cached one identified from step 211 related to the connected AP, is evaluated in step 213. If the probe failed, there will be no attempt to login and the client process flow will return to step 201. If the probe is successful success, the client 167 will attempt to perform the login process in step 205 as previously described in connection with FIG. 2A.

In one or more embodiments described herein, the probing capability makes it possible for the client 167 to work correctly on networks that use one SSID to cover more than one behavior model. For example, a large scale network may have a plurality of sub-networks (e.g., an airport network, a hotel network, a coffee shop network, etc.) that all use the same SSID, but depending on particular contract, companies may only be entitled to use certain ones of the sub-networks. The probing makes it possible for the client 167 to recognize the large scale network and then determine, based on configuration, which of the sub-networks is identified and only try to login to locations where it knows it will have a chance of success (i.e., an authorized sub-network).

In accordance with one or more embodiments, the client 167 can further include a signup process, as will be described with reference to the client process flow illustrated in FIG. 2C. The client process flow associated with the signup process illustrated in FIG. 2C is performed between steps 204 and 205 of FIG. 2A. After step 204, the client 167 determines whether the user has signed up or subscribed for service and has already provisioned their client 167 in step 220. If the user is already subscribed, the client process flow continues to step 205 to perform the login process as described in connection with FIG. 2A. If the user has not yet signed up for service, the client 167 determines in step 221 whether the user has already been given an opportunity to sign up this connection attempt. If such an opportunity has been provided to the user, the user will not again be offered the opportunity to sign up until the next time the user connects to the network and the client process flow will return to step 201. In one embodiment, the client 167 may provide the user with an option of not being asked again about signup.

If the user has not yet been provided with an opportunity to signup for service, the client 167 determines in step 222 whether the network allows for a connection to the signup server. Some networks will allow a user to signup for service while others will not, thus the determination of step 222 will prevent a user from being prompted to sign up for service when the client 167 cannot connect to the server to complete the signup process. If the network does not allow connection to the signup server, then the client process flow will return to step 201. If the signup server can be reached, the user is provided with the opportunity to signup in step 223. In one or more embodiments, an interface is provided that allows the user to signup for an account. At the conclusion of signup, if the user has successfully completed the signup process, the client 167 is provisioned with the new signup information (e.g., username and password) provided to the user. In one or more embodiments, this information is communicated between the signup server and the client without the user having to provide such information. Alternatively, the user can be prompted to provide such information. In step 224, the client determines whether the signup has been completed. If the signup process was not completed, the client process flow will return to step 201. If signup was completed, the client process flow will continue to the login step 205 as described previously.

FIG. 3, which comprises FIGS. 3A and 3B, provide a detailed client process flow for use in accordance one or more embodiments of the present disclosure.

At step 301, which can be performed by client 167 at startup, client 167 identifies and enumerates the network components (e.g., network drivers 152) present on device 108. In a case of Microsoft Windows, client 167 can examine network drivers 152 visible through the Windows standard Network Driver Interface Specification (NDIS) system.

For each candidate driver 152 found, the client 167 determines whether the network component is of interest to client 167. In a case of a Windows system, this can be done by looking at NDIS Object Identifiers (OIDs) corresponding to the network component found at step 301, in order to determine whether an OID corresponds to a Wi-Fi interface, e.g., those OIDs that describe 802.11 properties of an interface, such as OID_8021_11 OIDs, and in particular OID_802_11_NETWORK_TYPE and OID_802_11_SSID. This process is performed by steps 302 to 305, which examine each of the network components identified in step 301, to find "wireless network components and create a list of applicable network components, e.g., network drivers 152.

Client 167 monitors the identified network components, instances of network driver 152, to determine whether or not a connection state associated with any of the identified network components changes, e.g., to detect whether a state of a network interface connection changes. For example and in a case of Microsoft Windows, client 167 can examine NDIS OIDs signaling connection state changes on the interfaces, at step 306. In a case of Windows, for example, this can be done by monitoring NDIS OIDs for layer 2 connectivity.

To further illustrate by way of an example if O/S 158 comprises a Microsoft Windows O/S, client 167 can monitor NDIS OIDs to identify connection status changes at the MAC layer, and identify IP Address changes. In a case that client 167 detects an IP Address change, client 167 can look for a network identifier in the NDIS OID information for the given network driver 152 to retrieve an SSID. In a case that the SSID corresponding to a known network (e.g., the SSID exists in the AP database 168), client 167 can attempt to log the user onto the wireless network 102, using any one of a number of login procedures, including those described in U.S. patent application Ser. No. 10/325,450 and/or U.S. patent application Ser. No. 11/435,019.

If client 167 determines, at step 307, that there is a change in an applicable network interface connection, processing continues at step 309 to determine whether the change reflects a establishment of a layer 2 network connection, e.g., a network driver 152 has connected to a network at a low level and is able to perform basic network connectivity. If such a change in status is detected, processing continues at step 310 to determine whether the network with which a connection has been made is a known network. For example, client 167 can query AP database 168 using the SSID associated with AP 112 to which the network driver 152 is in communication to determine whether the SSID is a known SSID. In the case of an 802.11 network, this is done by checking the Service Set Identifier (SSID) of the network; in other networks another unique identifier may be used. On Windows, the SSID can be retrieved by examining an NDIS OIDs that contains the 802.11 network name, e.g., OID_802_11_SSID. If the network is known (e.g., the network is a known commercial network), processing continues at client 167 to identify the known network for monitoring, e.g., to determine whether or not a layer 3 connection is established. Thereafter, and if the network is determined not to be known (i.e., client 167 need not monitor a connection to an unknown network), processing continues at step 306 to monitor the network interface components.

If a known network is identified at step 311, the client 167 monitors the networking subsystem of O/S 158 to determine whether a layer 3 IP connection becomes available on the relevant network driver 152, at step 312. If a layer 3 connection is detected at step 312, processing continues at step 313 to log onto the wireless network 102 using the user's authentication information, e.g., authentication information provided by the user at the time that client 167 was transferred to device 108. In accordance with one or more embodiments, client 167 can either prompt the user with a dialog containing their username and password, allowing the user to click a Login button to start the login process, or client 167 can automatically start the login process, e.g., without user interaction. In accordance with one or more embodiments, an icon can be presented in a status area of a user interface displayable by device 108 to indicate that a connection is active and a login is required (e.g., the icon shown in FIG. 5B).

In accordance with one or more disclosed embodiments, client 167 simultaneously monitors for changes in a network interface component, and for changes in a network connection in which the user is logged into a wireless network 102. In a case of Windows, for example, a standard Windows Messaging Interface subsystem can be used to monitor IP changes on the interface (e.g., the connection on which the user is connected to wireless network 102), while at the same time continuously checking the applicable interfaces to identify whether there are any functional IP addresses (e.g., a layer 2 or layer 3 connection).

In accordance with one or more embodiments, the client 167 can alternatively perform probing in certain circumstances, as will be described with reference to the client process flow illustrated in FIG. 3C that is performed between steps 312 and 313 of FIG. 3B. After step 312, the client 167 determines whether the network 102 requires probing in step 312. In some embodiments, the client 167 could determine that probing is required from a field in the AP database 168. If the network 102 does not require probing, the client process flow would continue on to the login process in step 313 as described herein with reference to FIG. 3B.

If the network 102 does require probing, the client 167 will determine whether there exists a reliable cache or history or probing data in step 321. In accordance with embodiments disclosed herein, the cache would store the BS SIDs of networks that have been previously probed successfully and, additionally, could also store the BSSIDs for networks that have failed previous probes. If a probe result was found in the AP database 168 by the client 167, the client process flow would continue without further probing. If no probe result was found for the network, the client 167 would perform a probe for the network in step 322, such as but not limited to the probing techniques described above in reference to step 212 of FIG. 2B.

Next, the probe result, either the current from step 322 or a cached one identified from step 321 related to the connected AP, is evaluated in step 323. If the probe failed, there will be no attempt to login and the client process flow will return to step 302. If the probe is successful success, the client 167 will attempt to perform the login process in step 313.

Referring again to step 313 of FIG. 3B, in accordance with one or more embodiments, client 167 retrieves a login script associated with the SSID of the AP 112 instance identified by client 167 from the store of scripts (e.g., the script store provided by AP database 168), and executes the script. By way of non-limiting example, use of a script in a log in process is described in U.S. patent application Ser. No. 10/325,450. In accordance with one or more embodiments, if the login succeeds, an appearance of an icon, such as that shown in FIG. 5B can be changed to reflect that the user was successfully logged onto the network. For example, the appearance of the icon shown in FIG. 5B can be altered as shown in FIG. 5E, when the user is successfully logged onto the network. In addition or alternatively, in accordance with embodiments, a dialog can be presented to the user to indicate successful network login. For example, FIG. 5D provides an example of a dialog that can be presented to the user to notify the user that the logon procedure was successful. In accordance with one or more embodiments, a dialog can be presented to the user can be presented to the user during the logon process, an example of which is shown in FIG. 5C.

In accordance with one or more embodiments, the icon shown in FIGS. 5B and 5E can be used by the user to display the window shown in FIG. 5D, to allow the user to log off of the network. In such a case, any applicable script, e.g., a logout script stored in AP database 168 corresponding to the network, can be used to control client 167 to logout of the network. Use of a script to control client 167 to log onto or off of a network is discussed in more detail in U.S. patent application Ser. Nos. 10/325,450 and/or 11/435,019, the contents of both of which are incorporated herein by reference.

In a case that the login procedure fails, a dialog, e.g., the dialog shown in FIG. 5F, can be displayed to the user, which allows the user to attempt another login. In a case that the login procedure fails, another dialog can be presented, which contains relevant technical information helpful in troubleshooting, such as the dialog shown in FIG. 5G. FIG. 5G can be displayed in response to the user selecting the "See Support Page" link provided in the dialog shown in FIG. 5F. The dialog shown in FIG. 5G can be used to display information regarding the network the user is connecting to and the client software in use. For example and as shown in the example of FIG. 5G, the information can include software version information, database version information, network SSID, network addresses on both the IP and MAC layer, and an identifier of the script used in attempting to connect the user to the network, as well as a support contact number.

Once a user is logged in, the client 167 can continue to monitor the applicable interfaces. If a disconnect is detected on a network interface connection at step 314, the client 167 can notify the user of a change in the connection status at step 315. For example, client 167 can cause the icon shown in FIG. 5E to change in appearance, e.g., the icon's appearance changes to that shown in FIG. 5B. For example, an appearance of the icon can change by changing the color of a portion of the icon. It should be apparent that any type of notification can be used with embodiments presently disclosed. Processing continues at step 306 to monitor the applicable interfaces.

In accordance with one or more embodiments, client 167 can be used to prompt the user to select an account associated with a certain wireless provider, in a case that multiple wireless providers might be available, for example. FIG. 5A provides an example of a dialog used to alert the user that a given wireless provider account is available for use in accordance with embodiments of the present disclosure. In accordance with at least one embodiment, such a dialog window is displayed on a screen of device 108, and sits on top of other application windows. In accordance with one or more embodiments, the given wireless network provider identified by client 167 corresponds to the wireless network provider from which client 167 was provided during a sign up process. In accordance with one or more embodiments, the network provider comprises an aggregate network provider which acts to aggregate multiple network providers to the user, such that the aggregate network provider provides an interface between the user and the multiple network providers. The username and password provided by the user as part of the signup process can be used to "pre-populate" the login window. Thus, the user can simply select the "Login" button in order to start the authentication process, to log onto a hot spot.

In accordance with one or more embodiments, client 167 can use a network connection, to automatically check for updates to its configuration 166, which can include updates to AP database 168, scripts referenced by AP database 168, and/or software updates, for example. A process to update such information is further described in U.S. patent application Ser. No. 10/325,450, for example.

FIG. 4, which comprises FIGS. 4A to 4F, provides examples of dialogs presented to a user during a sign up process for use with one or more embodiments disclosed herein.

Figure 4A:
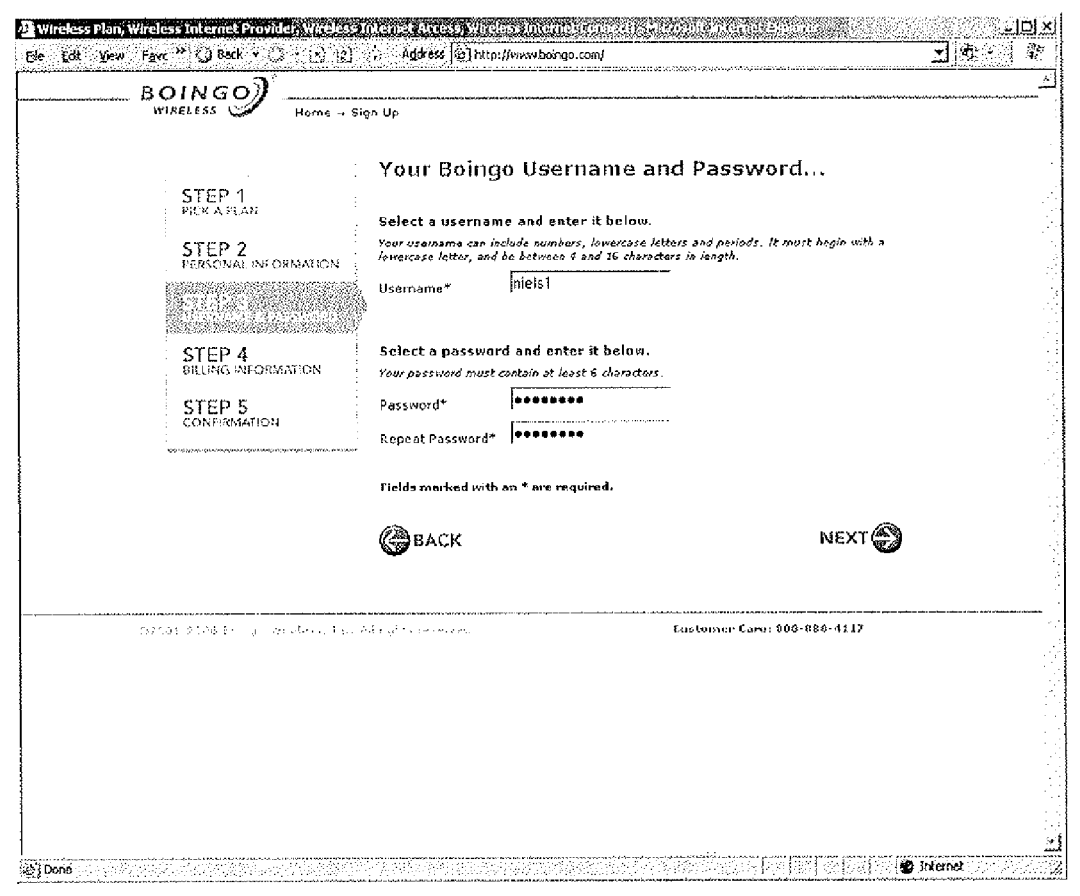
Figure 4B:
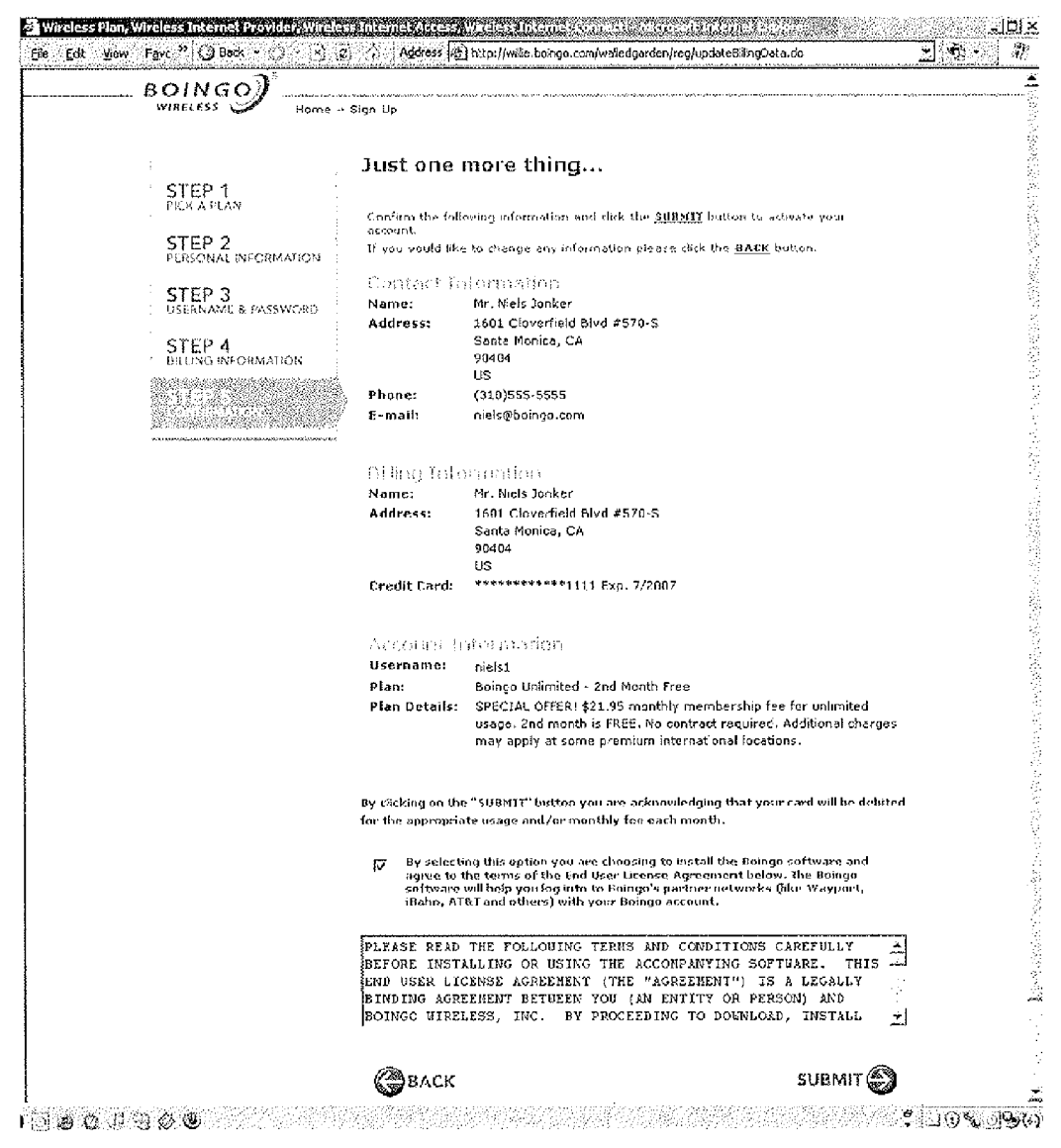

FIGS. 4A and 4B provide examples of a window displaying sign-up forms. FIG. 4A can be displayed after the user has picked a usage plan of the wireless provider and provided personal information (e.g., full name, address, etc.), to allow the user to select a username and password. As discussed, this input can be saved and used to automatically configure client 167 on device 108 such that the user need not re-enter this information.

FIG. 4B can be used to display a confirmation dialog, which includes a checkbox to allow the user to confirm the download of the program code in which functionality of client 167 software is embodied, and to confirm corresponding terms and conditions. In accordance with one or more embodiments, by default, the checkbox is selected, which can cause an automatic download of the software when the user presses the "Submit" button on the form. If the user does not wish to download the software, the user can remove the check in the checkbox (e.g., "un-check" the checkbox).

Figure 4C:
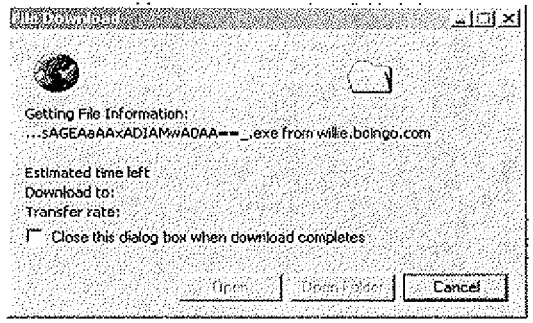
Figure 4D:
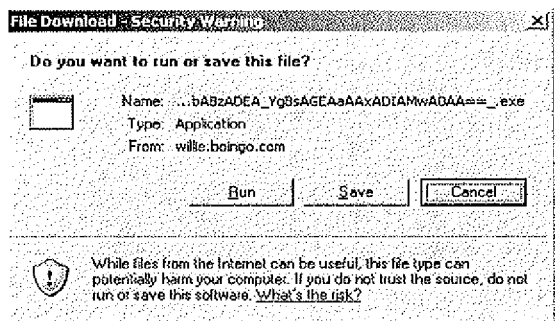

In accordance with one or more embodiments, when the file containing the program code is downloaded, the username and password provided by the user can be are included as part of the file's filename downloaded to the device 108. A simple encoding scheme can be used, resulting in a unique filename for each user that signs up. FIG. 4C provides an example of a download dialog which includes a filename comprising an encoded username and password. Subsequently, a dialog can be displayed by O/S 158, such as that shown in FIG. 4D, which prompts the user to execute program code contained in the file downloaded to device 108.

Figure 4E:
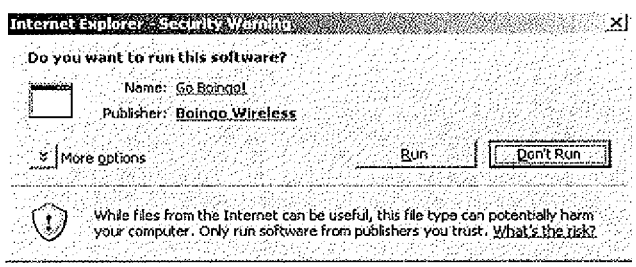
Figure 4F:
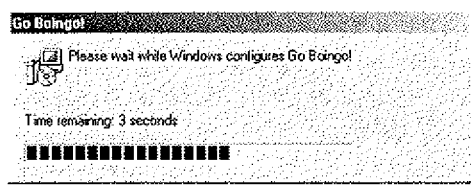

When the user selects the "Run", the installation process can be invoked by O/S 158, and a dialog such as that shown in FIG. 4E can be displayed. Since authentication information, e.g., username and password, were provided as part of the information downloaded to device 108, the user need not provide any input during the setup process, i.e. the user need not provide a username, password or any other installation information. Client 167 is installed and automatically configured with a username and password, e.g., the same one the user provided during the signup process. In accordance with one or more embodiments, downloading of a client 167 onto the user's device, and the provisioning of the client with the user's authentication information is integrated with the user's signing up for Wi-Fi service.

In accordance with one or more embodiments, client 167 need not be involved in the initial stages of Wi-Fi connectivity on a device 108, and can become involved at a time that a viable/usable network connection is detected. In addition and in accordance with one or more embodiments, an installation process, which includes an installation of client 167, can be performed as part of user signup process. Username and password information, or any other authentication information, supplied by the user during the signup process is downloaded to device 108, such that the user need not manually enter a username and password in order to log onto a wireless network using the account corresponding to the authentication information. An installed client 167 can assume that another mechanism available on device 108, such as O/S 158 and/or network drivers 152 (which can be a part of O/S 158), can be used to provide core functionality to connect to the Wi-Fi Network.

Thus, embodiments disclosed in U.S. patent application Ser. Nos. 10/325,450 and 11/435,019 can be modified such that a client component, e.g., access client 100 of device 102 described in U.S. patent application Ser. No. 10/325,450 and a configured client 108 described in U.S. patent application Ser. No. 11/435,019, can make use of functionality internal to an operating system (e.g., O/S 158) or other software or program code, which can establish a network connection at a level that the client component can log a user onto wireless network 102, and establish a session for the user.

With reference to U.S. patent application Ser. No. 10/325,450, for example, client 167 can be used to augment, supplement or to modify, functionality provided by access client 100, such that access client 100 need not detect carrier network signals. Rather, access client 100 can monitor network driver 152 and/or O/S 158 network detection and association activity (e.g., or other functionality provided by other software/hardware of the device 102), at which point access client 100 can complete the process to log a user onto a network, as described in connection with one or more embodiments of the present disclosure. For example, once O/S 158 establishes a connection, disclosed embodiments provide the ability to obtain information corresponding to the network interface connection established by the network driver/interface 152, such as the SSID (for Wi-Fi) of the network. The obtained information can then be used to retrieve information about the network from AP database 168 (also referred to as AP database 116) in U.S. patent application Ser. No. 10/325,450.

In accordance with one or more embodiments, rather than displaying a list of networks/signals detected such that the user can select one, O/S 158 can be used to select a network (e.g., using Wireless Zero Configuration Service (WZC) provided by Windows XP). Since O/S 158 is used to select a network, in accordance with one or more embodiments, user preference, profile or network list storing need not be used. Once O/S 158 (or other component(s)) select the network, client 167 can select an account for the user to connect to wireless network 102, and then log the user onto the wireless network 102 using authentication information associated with the selected account.

In accordance with embodiments disclosed, sniffer logic 200 and association logic 204 need not be used, since client 167 functions to monitor network interface connections to determine whether a network interface connection becomes available and is connected, and to initiate a login process such as that described in U.S. patent application Ser. No. 10/325,450. In accordance with one or more embodiments disclosed herein, however, client 167 can use the updater logic 212, login logic 206 and databases (e.g., databases 116 to 118 and 120 on the client of U.S. patent application Ser. No. 10/325,450.

One or more embodiments disclosed herein can use an authentication sequence, such as that shown in FIG. 12 (e.g., elements 1308, 1310, 1312, 1314, 1316, 1318 and 1320) of U.S. patent application Ser. No. 10/325,450 to authenticate a user, for example.

In accordance with one or more embodiments, behavior/appearance of an access point icon such as that described U.S. patent application Ser. No. 10/325,450, can be modified to reflect three states of client 167. Such an access point icon can appear white when client 167 detects a connection to a known AP 112 but the login process has not yet been completed, and no access point icon in a case that there is no connection to a known AP 112 is detected or there is a detected connection to an unknown AP 112. Transition from the white state to green occurs by operation of a login process, and a transition from green to white can occur by operation of a logout process. Transition from no icon to a white state can occur by way of establishing a connection to a known network (e.g., via O/S 158), and transition from a white or green icon to no icon can occur by way of a disconnection from the network (e.g., by something other than client 167).

In accordance with one or more embodiments, client 167 can be used to collect quality of service data and can be updated, such as that described in U.S. patent application Ser. No. 10/325,450 (e.g., including that depicted in FIGS. 9 to 11 and related discussion). In addition and in accordance with embodiments disclosed, client 167 can be configured to use method scripts described in U.S. patent application Ser. No. 10/325,450 (e.g., including the description relating to FIGS. 16 to 18 of U.S. patent application Ser. No. 10/325,450).

Similarly, embodiments of the present disclosure can be used to augment, supplement, or modify, functionality provided by client 108 of U.S. patent application Ser. No. 11/435,019. As described herein client 167 can be used to passively detect an available network connection, which available network connection can then be used to log a user onto a wireless network 102. Embodiments disclosed herein can use the scripting capabilities described in U.S. patent application Ser. No. 11/435,019.

In accordance with one or more embodiments, client 167 can use such configuration format such as that shown and described in either of U.S. patent application Ser. Nos. 10/325,450 and 11/435,019.

The above are not intended to be examples a manner in which features described in one or both of U.S. patent application Ser. Nos. 10/325,450 and 11/435,019 can be used in accordance with one or more embodiments of disclosed herein. It should be apparent that this is not an exhaustive set. For example, and with limitation, various other aspects of the scripting and configuration file format described in U.S. patent application Ser. No. 11/435,019 can be used with one or more embodiments of the present disclosure.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for execution on a client device of achieving login to a wireless network, the method comprising:
   providing a client utility on the client device wherein the client utility is a separate component from an operating system on the client device; and
   employing the client utility to:
   (a) identify a plurality of network components present on the client device;
   (b) examining each of the network components to detect which of said network components is a wireless network component and creating a list listing each detected wireless network component;
   (c) detect establishment of a layer 2 network connection by the operating system via a first wireless network component from the plurality of network components;
   (d) establish a layer 3 IP connection via the first wireless network component;
   (e) detect a disconnection of the first wireless network component;
   (f) detect establishment, subsequent to the disconnection of the first wireless network component, of a layer 2 network connection by the operation system via a second wireless network component from the plurality of network components; and
   (g) establish a layer 3 connection via the second wireless network component.

2. The method of claim 1 wherein each of the plurality of network components comprises a network driver.

3. The method of claim 1, wherein one or more of establishing the layer 3 IP connection via the first wireless network component and establishing the layer 3 IP connection via the second wireless network component includes:
   displaying a prompt on a display screen of the client device that contains a username and a password for a user of the client device; and
   proceeding with a login process in response to receiving a selection of the prompt by the user via the client device.

4. The method of claim 3, wherein the username and password are retrieved by the client utility and populated in the prompt automatically and without user interaction.

5. The method of claim 1, wherein one or more of establishing the layer 3 IP connection via the first wireless network component and establishing the layer 3 IP connection via the second wireless network component is performed automatically without user interaction.

6. The method of claim 1, wherein one or more of establishing the layer 3 IP connection via the first wireless network component and establishing the layer 3 IP connection via the second wireless network component includes retrieving, by the client utility from a database, a login script associated with an access point.

7. The method of claim 1, wherein detecting the disconnection of the first wireless network component includes visually indicating the disconnection of the first wireless component via a display screen of the client device.

8. The method of claim 1, wherein detecting establishment of the layer 2 network connection via the first wireless network component includes receiving, by the client utility, network driver events from the operating system.

9. A non-transitory computer-readable medium storing instructions that, when executed by a client device, implement a client utility that is a separate component from an operating system on the client device, the client utility configured to:
   (a) identify a plurality of network components present on the client device;
   (b) examine each of the network components to detect which of said network components is a wireless network component and create a list listing each detected wireless network component;
   (c) detect establishment of a layer 2 network connection by the operating system via a first wireless network component from the plurality of network components;
   (d) establish a layer 3 IP connection via the first wireless network component;

(e) detect a disconnection of the first wireless network component;
(f) detect establishment, subsequent to the disconnection of the first wireless network component, of a layer 2 network connection by the operating system via a second wireless network component from the plurality of network components; and
(g) establish a layer 3 IP connection via the second wireless network component.

10. A client device comprising:

a processor; and memory coupled to the processor and storing instructions that, when executed by the client device, implement a client utility that is separate component from an operating system on the client device, the client utility configured to:

(a) identify a plurality of network components present on the client device;

(b) examine each of the network components to detect which of said network components is a wireless network component and create a list listing each detected wireless network component;
(c) detect establishment of a layer 2 network connection by the operating system via a first wireless network component from the plurality of network components;
(d) establish a layer 3 IP connection via the first wireless network component;
(e) detect a disconnection of the first wireless network component;
(f) detect establishment, subsequent to the disconnection of the first wireless network component of a layer 2 network connection by the operating system via a second wireless network component from the plurality of network components; and
(g) establish a layer 3 IP connection via the second wireless network component.

* * * * *